(12) United States Patent
Wood

(10) Patent No.: US 8,205,841 B2
(45) Date of Patent: Jun. 26, 2012

(54) CAMERA DOLLY

(76) Inventor: Dennis Wood, Thunder Bay (CA)

( * ) Notice: Subject to any disclaimer, the term of this patent is extended or adjusted under 35 U.S.C. 154(b) by 395 days.

(21) Appl. No.: 12/367,663

(22) Filed: Feb. 9, 2009

(65) Prior Publication Data

US 2009/0212194 A1    Aug. 27, 2009

Related U.S. Application Data

(60) Provisional application No. 61/027,218, filed on Feb. 8, 2009.

(51) Int. Cl.
*A47K 1/04* (2006.01)
(52) U.S. Cl. ............................ 248/129; 248/128; 16/45
(58) Field of Classification Search ................. 248/128, 248/129, 130, 131, 188.4, 188.7, 188.1, 188.8, 248/187.1, 647, 649, 677; 16/28, 29, 40, 16/45

See application file for complete search history.

(56) References Cited

U.S. PATENT DOCUMENTS

| | | | | |
|---|---|---|---|---|
| 975,941 | A * | 11/1910 | Fiset | 248/129 |
| 2,534,367 | A * | 12/1950 | Perrotta et al. | 280/35 |
| 2,808,220 | A * | 10/1957 | Jones | 248/129 |
| 3,173,642 | A * | 3/1965 | Greenspan | 248/170 |
| 4,699,484 | A * | 10/1987 | Howell et al. | 352/243 |
| 4,898,353 | A * | 2/1990 | Jih et al. | 248/188.7 |
| 5,137,235 | A * | 8/1992 | Wentworth et al. | 248/124.1 |
| 5,379,870 | A * | 1/1995 | Sadow | 190/18 A |
| 5,490,684 | A * | 2/1996 | Chapman | 280/47.11 |
| 5,639,056 | A * | 6/1997 | Mecalf | 248/523 |
| 5,730,450 | A * | 3/1998 | Chapman | 280/47.11 |
| 6,068,224 | A * | 5/2000 | Horiuchi | 248/187.1 |
| 6,095,464 | A * | 8/2000 | du Rees | 248/188.7 |
| 6,439,515 | B1 * | 8/2002 | Powers | 248/129 |
| 6,513,769 | B1 * | 2/2003 | Chapman | 248/125.1 |
| 6,557,775 | B1 * | 5/2003 | Brinson et al. | 238/10 R |
| 6,695,268 | B1 * | 2/2004 | Hsieh | 248/188.7 |
| 6,775,475 | B1 * | 8/2004 | Traver | 396/1 |
| 6,964,423 | B1 * | 11/2005 | Chieh et al. | 280/79.11 |
| 7,624,953 | B2 * | 12/2009 | Silverman et al. | 248/125.1 |
| 7,637,215 | B2 * | 12/2009 | Fisher | 105/159 |
| 7,703,728 | B2 * | 4/2010 | Petrick et al. | 248/188.7 |
| 7,730,824 | B1 * | 6/2010 | Black | 89/37.03 |
| 7,735,789 | B2 * | 6/2010 | Blankenship et al. | 248/129 |
| 2003/0075070 | A1 * | 4/2003 | Spielberg et al. | 104/130.01 |
| 2007/0095246 | A1 * | 5/2007 | Heiligenmann | 104/307 |
| 2008/0315542 | A1 * | 12/2008 | Fisher | 280/86 |
| 2009/0008899 | A1 * | 1/2009 | Blankenship et al. | 280/288.4 |
| 2009/0315288 | A1 * | 12/2009 | Hernandez | 280/79.3 |
| 2010/0059954 | A1 * | 3/2010 | Fisher | 280/86 |

* cited by examiner

*Primary Examiner* — Nkeisha Smith
(74) *Attorney, Agent, or Firm* — Ryan W. Dupuis; Kyle R. Satterthwaite; Ade & Company Inc.

(57) ABSTRACT

A camera dolly comprises a base and a plurality of legs extending radially outward from an inner end pivotally coupled on the base to an outer end supporting a wheel assembly thereon such that the wheel assemblies are arranged for rolling movement along a pair of rail members extending in a longitudinal direction. Each wheel assembly comprises a plurality of wheels spaced apart from one another in the longitudinal direction in two rows arranged to receive the respective rail member therebetween. Each wheel assembly is pivotal about an upright axis and a horizontal axis relative to the respective leg. A horizontal deck plate includes plural sets of mounting apertures therein corresponding to different relatively fixed relationships of the legs. A socket formed centrally in the base threadably receives an upright post therein which support the camera thereon spaced above the base.

17 Claims, 4 Drawing Sheets

CAMERA DOLLY

This application claims the benefit under 35 U.S.C. 119(e) of U.S. provisional application Ser. No. 61/027,218, filed Feb. 8, 2009.

FIELD OF THE INVENTION

The present invention relates to a camera dolly for supporting a camera for rolling movement along the ground, and more particularly the present invention relates to a camera dolly including pivotally supported wheel assemblies arranged for rolling along a track.

BACKGROUND

Camera dollies are well known for supporting various forms of cameras thereon for rolling movement along a desired path while capturing video with the camera. Many types of camera dollies are particularly suited for following a pair of parallel and spaced apart rails which define a track along which the dolly rolls. The dolly typically includes wheel assemblies which roll along the rails of the track in which the wheel assemblies are known to have a plurality of wheels spaced apart in the direction of rolling movement. The wheel assemblies are typically pivotally supported about vertical axes relative to a base of the dolly supporting the camera thereon however the heights of all of the wheels relative to the base are generally fixed so that when rolling over bumps or hilly areas of the track, it is common for some or all of the wheels of certain wheel assemblies to become derailed from the track potentially resulting in damage to camera equipment and lost productivity in filming with the camera.

SUMMARY OF THE INVENTION

According to one aspect of the invention there is provided a camera dolly comprising:
 a base arranged to support a camera thereon;
 a plurality of legs extending from the base;
 a wheel assembly associated with each leg;
 each wheel assembly comprising a plurality of wheels supported for rolling movement in a longitudinal direction of the wheel assembly;
 at least one of the wheels of each wheel assembly being spaced in the longitudinal direction from at least one other one of the wheels of the wheel assembly;
 a pivot assembly supporting each leg on the associated wheel assembly for relative pivotal movement about a first axis which is upright and about a second axis which is generally horizontal and perpendicular to the longitudinal direction.

By providing pivot assemblies which permit pivotal movement of the wheels about both a vertical axis and a horizontal axis perpendicular to the rolling direction of the wheels, the wheel assemblies are permitted an additional degree of freedom for rocking in a forward and rearward direction relative to the rolling direction to ensure that most of the wheels of the wheel assemblies remain in contact with the respective rails at all times so as to reduce the likelihood of derailment.

Preferably, the plurality of wheels of each wheel assembly are arranged in two rows of wheels extending in the longitudinal direction in which the wheels of one row are each offset in the longitudinal direction from each of the wheels of the other row.

By further arranging each of the wheels to be spaced in a longitudinal direction relative to wheels of the opposing row of wheels within each wheel assembly, even when bumps or hilly areas occur in the track, only one wheel is affected by the bump so as to limit the overall reaction of the wheel assembly and thus further discourage derailment.

Preferably two adjacent ones of the legs include an outer end portion supported for pivotal movement relative to a remaining inner portion mounted on the base about an upright axis wherein the wheel assemblies of said two adjacent ones the legs are supported on the respective outer end portion spaced radially outward from the respective upright axis to vary in spacing from other ones of the wheels assemblies when the respective outer end portion is pivoted relative to the respective leg.

When the wheels of each wheel assembly are supported in two rows, preferably each wheel is rotatable about a respective axis of rotation extending downwardly and outwardly from the other row.

The axes of rotation of the wheels in one row may lie in a plane oriented perpendicularly to a plane containing the axes of rotation of the wheels of the other row.

When provided in combination with a track comprising a pair of parallel and spaced apart rail members along which the wheel assemblies are arranged for rolling movement in the longitudinal direction, preferably each wheel assembly comprises two rows of wheels and a lower peripheral surface of the wheels in each row preferably forms one side of an inverted V-shaped recess receiving the respective rail member therein.

Preferably the base comprises a central base member from which each of the legs extends in a generally radial direction with each leg being coupled to the central base member for pivotal movement relative to the central base member about an upright axis to adjust a spacing between the wheel assemblies upon which the legs are supported.

Preferably each leg is pivotally supported on the base for pivotal movement relative to the base in a generally horizontal plane between a first position oriented substantially parallel to the longitudinal direction and a second position oriented near 45 degrees in inclination to the longitudinal direction.

Preferably there is provided a mounting member fixedly coupling the legs relative to one another at a selected one of plural different orientations relative to one another.

Preferably the mounting member comprises plural sets of mounting apertures therein arranged for receiving fasteners therethrough for securement to the legs to fix the legs relative to one another in which each set of mounting apertures corresponds to a different relative orientation of the legs.

The mounting member may comprise a generally horizontally extending deck plate spanning a top side of the legs.

The base may comprise an upper plate and a lower plate spanning generally horizontally spaced one above the other in which an inner end of each of the legs is coupled between the upper plate and the lower plate for pivotal movement about a respective upright axis relative to the base.

The base may comprise a central member from which each of the legs extend in a generally radial direction in which the base includes an internally threaded socket formed therein and wherein there may be provided a post threadably received in the internal socket which is arranged to supported a camera thereon spaced above the base. Preferably the legs are coupled to the central member at circumferentially spaced positions about the internally threaded socket.

According to a second aspect of the present invention there is provided a camera dolly comprising:
 a base arranged to support a camera thereon;
 a plurality of legs extending from the base;

a wheel assembly associated with each leg and arranged to support the leg thereon;

the base comprising a central member from which each of the legs extend in a generally radial direction;

each leg being coupled to the central base member for relative pivotal movement to adjust a spacing between the wheel assemblies upon which the legs are supported; and a mounting member fixedly coupling the legs relative to one another at a selected one of plural different orientations relative to one another.

According to a third aspect of the present invention there is provided a camera dolly arranged for supporting a camera for rolling movement in a longitudinal direction, the camera dolly comprising:

a base arranged to support the camera thereabove;

a plurality of legs extending from the base;

a wheel assembly mounted on an outer end of each leg and arranged to support the leg thereon for rolling movement in the longitudinal direction;

the base comprising:

a central member upon which an inner end of each of the legs is supported such that each of the legs extends outward in a generally radial direction to the respective wheel assembly supported thereon; and an internally threaded socket formed centrally in the central member about which the inner ends of the legs are circumferentially spaced; and an upright post having a bottom end threadably received in the internal socket and being arranged to supported the camera thereon spaced above the base.

One embodiment of the invention will now be described in conjunction with the accompanying drawings in which:

BRIEF DESCRIPTION OF THE DRAWINGS

In FIGS. 4 through 7 two positions of the legs are illustrated at the same time, overlaid with one another to illustrate a desirable range of motion of the legs relative to the base to vary the width of the dolly in a lateral direction which is perpendicular to the longitudinal direction of rolling movement.

In the drawings like characters of reference indicate corresponding parts in the different figures.

DETAILED DESCRIPTION

Figure 1:
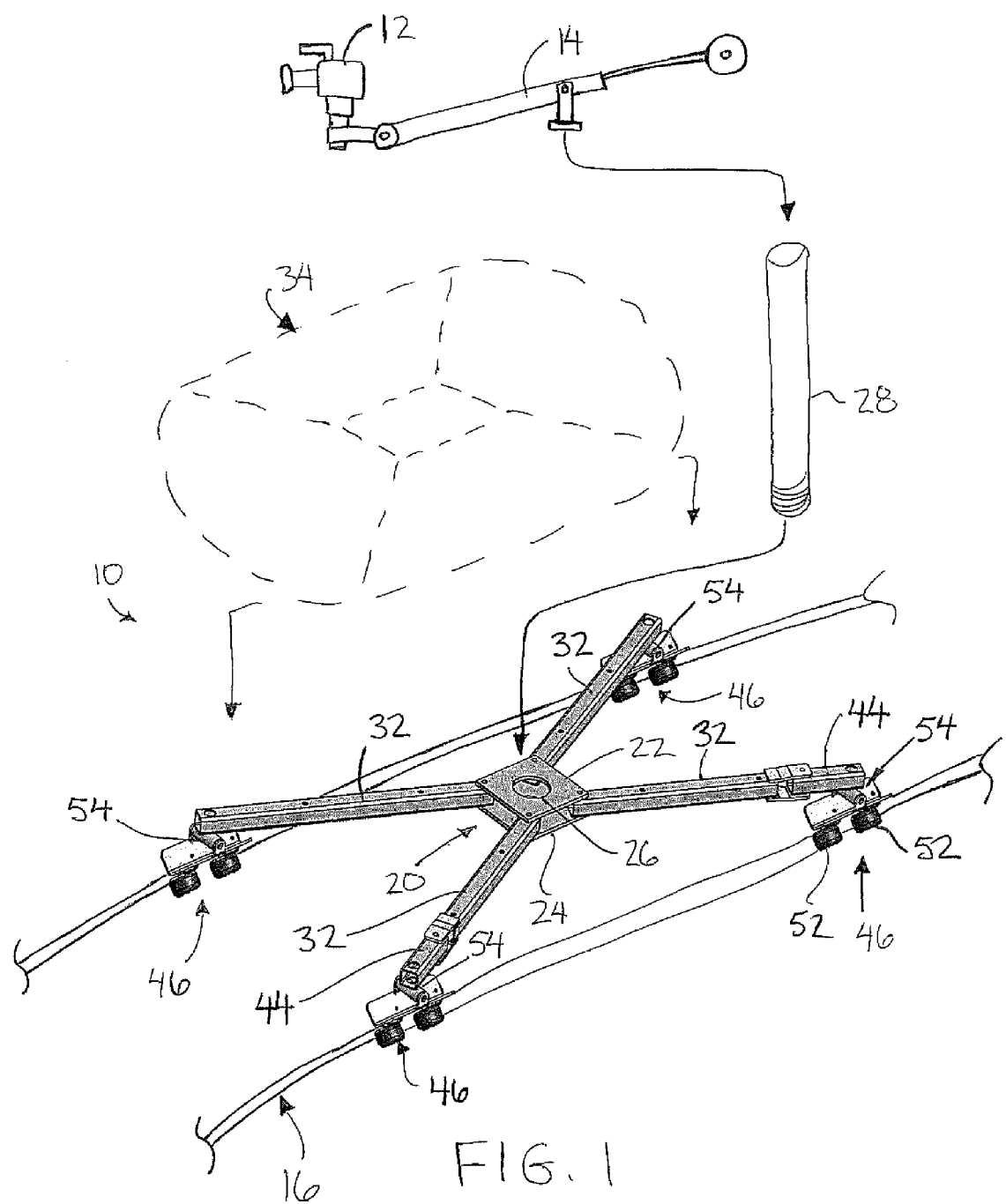
FIG. 1 is an exploded perspective view of the dolly.
Figure 2:
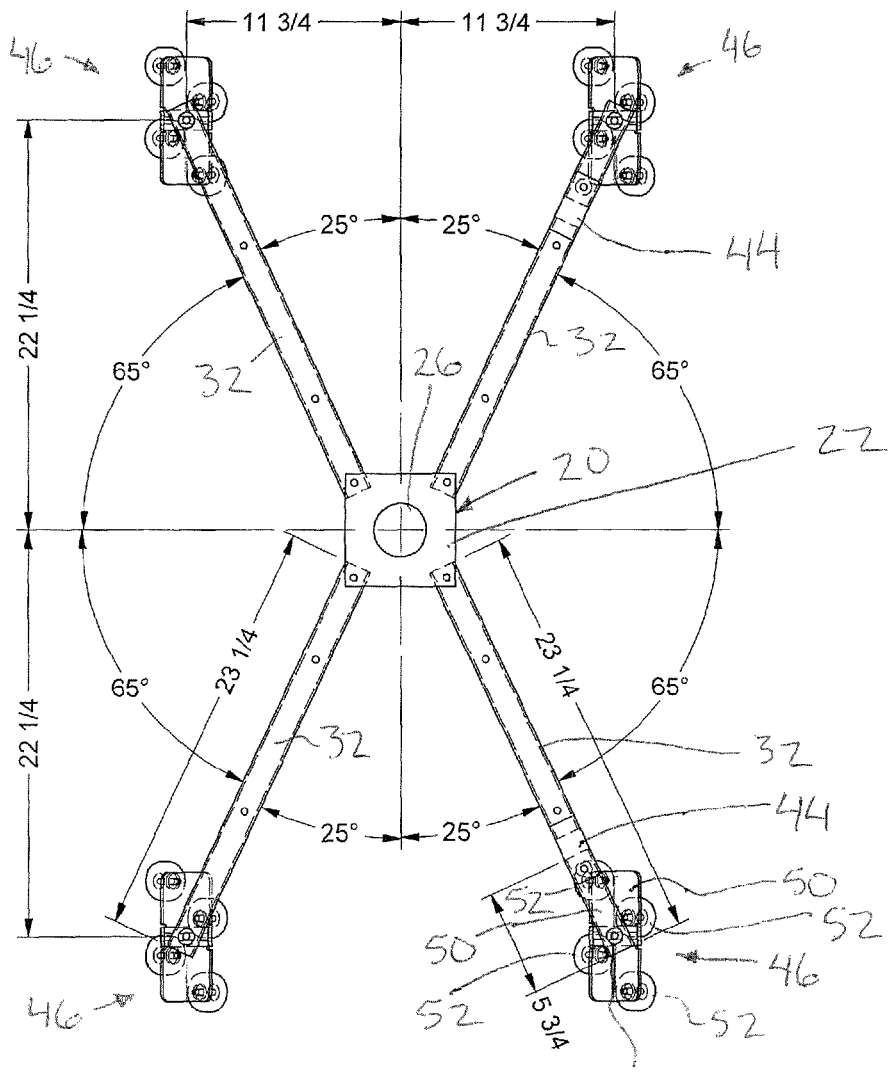
FIG. 2 is a top plan view of the base of the dolly with the decking shown removed.
Figure 3:
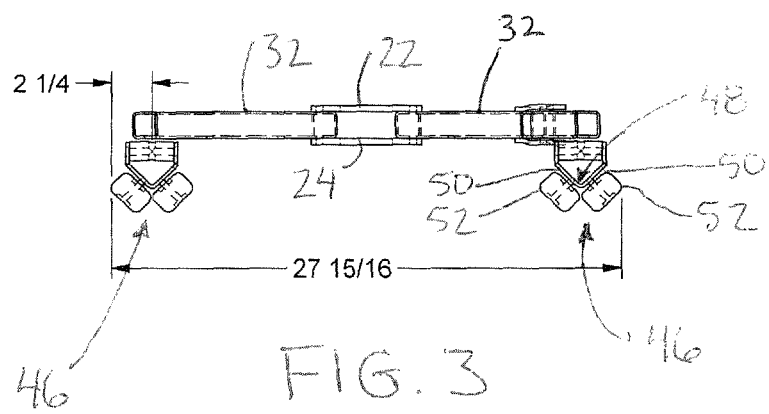
FIG. 3 is an end elevational view of the base showing the decking removed.
Figure 4:
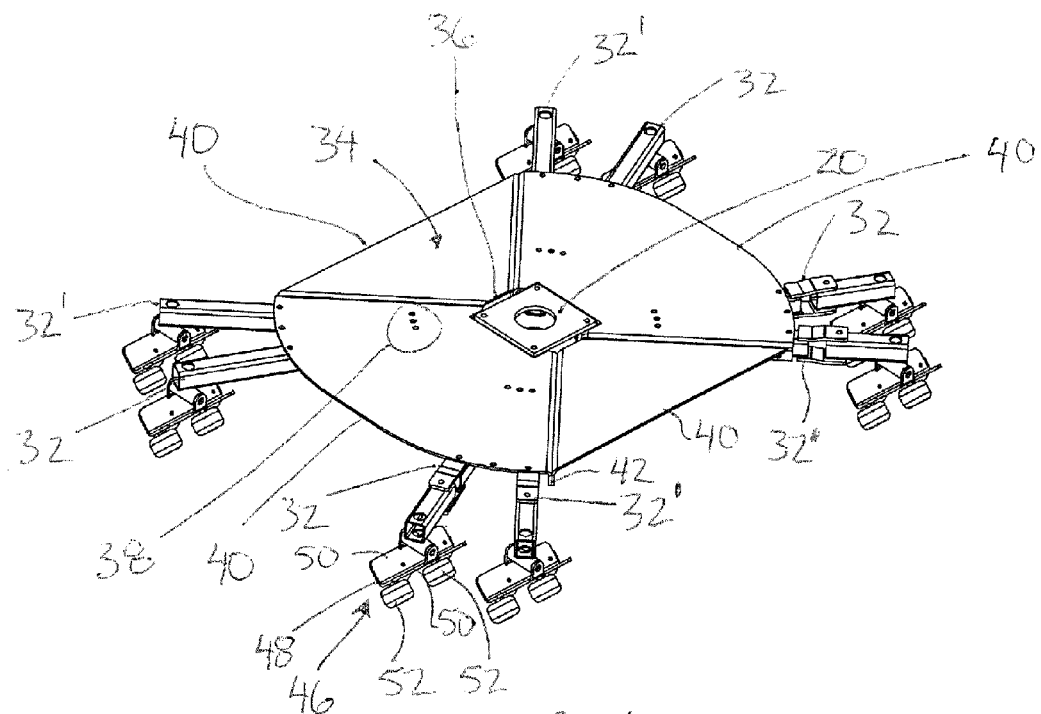
FIG. 4 and FIG. 5 are perspective views of the dolly shown from top and bottom sides of the decking respectively.
Figure 5:
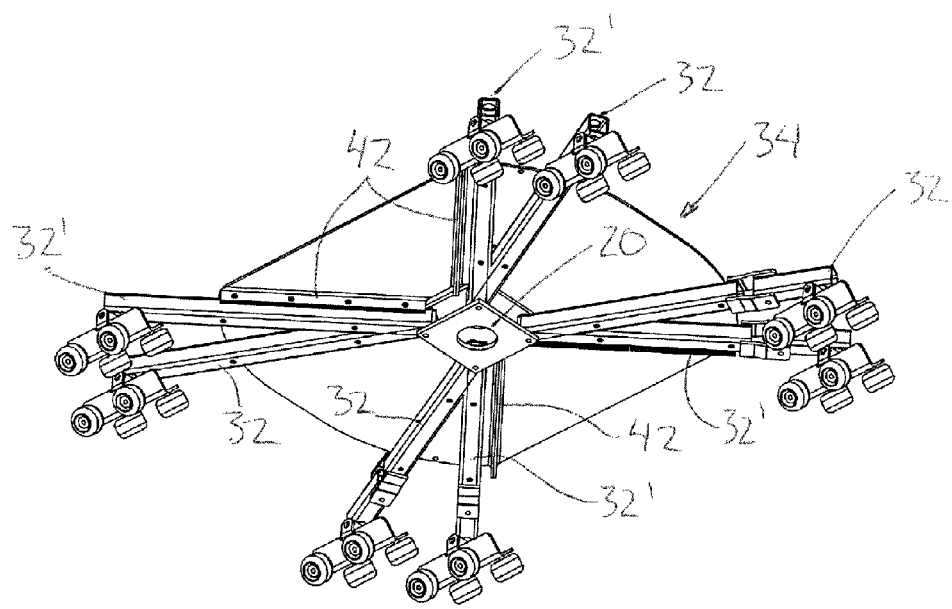
Figure 6:
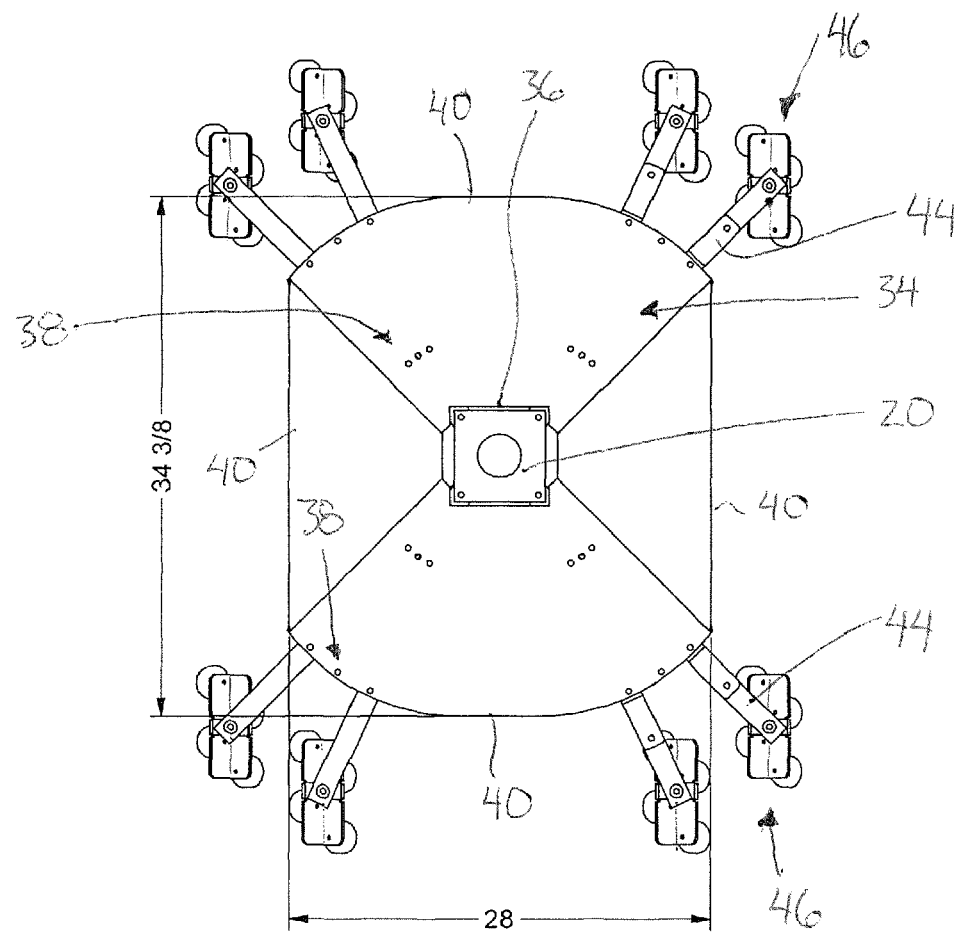
FIG. 6 is a top plan view and FIG. 7 is an end elevational view of the base shown with the decking supported thereon.
Figure 7:
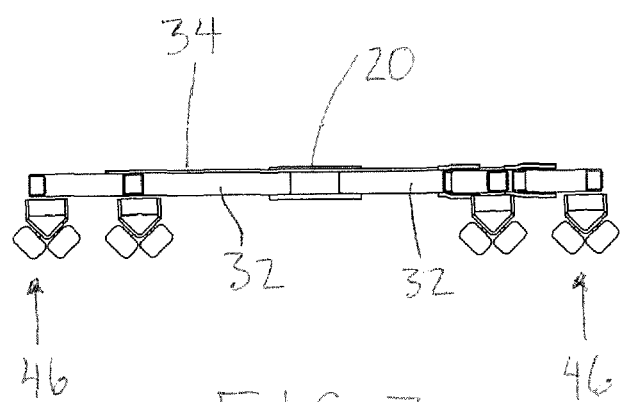

Referring to the accompanying figures there is illustrated a camera dolly generally indicated by reference numeral 10. The dolly 10 is particularly suited for supporting a camera 12 on a jib 14 such that the camera is supported for rolling movement along a track 16 in a longitudinal direction of the track. The track 16 typically comprises a pair of rail members which are supported generally parallel and spaced apart from one another.

The dolly 10 includes a base 20 comprising a central member in the form of an upper plate 22 and a lower plate 24, each arranged to span horizontally spaced apart one directly above the other. Each of the plates is generally square in shape and oriented with the corners aligned with one another. A central aperture 26 is provided in the plates which is internally threaded to define a threaded socket which receives the bottom end of an upright mounting post 28 therein. The bottom end of the post includes suitable threads thereon for mating connection with the threads of the centre aperture. An upper end of the post 28 is suitably arranged for supporting the jib 14 and the camera 12 thereon.

A plurality of legs 32 are mounted on the base 20. Each leg 32 comprises an elongate rigid member which is pivotally supported at an inner end between the upper plate 22 and the lower plate 24 of the base for pivotal movement about a vertical pivot shaft connected between the upper and lower plates at a respective one of the corners of the plates so that four legs 32 are provided in total extending outward from the four corners of the base 20. The legs 32 are generally pivotal within a common horizontal plane so that each leg extends generally radially outward relative to the central aperture 26 in the base which receives the post 28 therein for mounting the camera thereon. The inner ends are of the legs are supported on the base at circumferentially spaced locations about the central aperture 26 to extend horizontally outward in a generally common plane to the respective outer ends thereof.

A mounting member comprising a deck 34, in the form of a horizontally extending plate, is supported directly on the legs, spanning across a top side of the legs 32, for fixing the legs at a selected one of plural different orientations relative to the base and to one another. The deck 34 includes a centrally located generally square aperture 36 which aligns with the square base 20 such that the deck 34 is generally annular in form about the square base 20. A plurality of sets of mounting apertures 38 are provided in the deck 34 in which each set of apertures corresponds to a different mounting configuration and different relative orientation of the legs.

The deck is formed in four different sections 40 in which each section extends partway about a circumference of the deck so that the four sections are divided radially in relation to the central aperture 26 relative to one another. The sections 40 are joined to one another by depending flanges 42 depending from opposing edges of each section of the deck so that overlapping depending flanges 42 of two adjacent sections 40 can be fastened together with suitable fasteners. The sections 40 are suitably sized so that the seams between adjacent sections are not aligned with or overlap the range of motion of the legs 32 as they are pivoted between wider and narrower configurations. The legs are typically pivoted relative to the base and to one another in a generally horizontal plane through a range of movement from a first position being near parallel to the longitudinal direction of rolling movement of the wheel assemblies to a second position being near to 45 degrees in inclination to the longitudinal direction of rolling movement.

The legs 32 are each arranged to be longer than the radial distance of the deck 34 from the inner end to the outer end of the legs so that an outer end of each leg projects outwardly beyond the edge of the deck. Two of the adjacent legs along one common side of the dolly, which is symmetrical to the other side about a plane extending in the longitudinal direction of rolling movement, include a pivotal outer end portion 44 which is supported for pivotal movement about a vertical axis relative to a remaining inner portion of the leg 32 which is overlapped by the deck 34.

Wheel assemblies 46 are mounted at the outer end of each leg 32 so as to be located at the outer end of the end portion 44 of the two legs which include outer end portions, at a location spaced radially outward from the respective pivot axes of the outer end portions. In this arrangement the wheel assemblies are pivotal with the outer end portions 44 towards and away from the wheel assemblies on the opposing side of the dolly for adjusting the width of the wheel base between the wheel assemblies on the opposing sides of the dolly in a lateral direction which is perpendicular to the longitudinal direction of rolling movement.

Each wheel assembly includes a channel 48 comprising a frame member having two flanges 50 extending in the longitudinal direction of rolling movement of the wheel assembly at right angles to one another so as to form a generally V-shape in cross section. A pair of wheels 52 are supported on each of the flanges 50 spaced apart from one another in the longitudinal direction for rotation about respective axles which project perpendicularly to the respective flange 50 upon which they are mounted. The axes about which the wheels are rotatable are thus inclined at approximately 45 degrees from horizontal to extend downwardly and outwardly from the central channel 48. Accordingly, within each wheel assembly the axes of rotation of the wheels in one row lie in a plane oriented perpendicularly to a plane containing the axes of rotation of the wheels of the other row.

As noted above, two rows of wheels 52 are defined along the two flanges of each wheel assembly respectively. An inverted V-shaped recess is thus defined in the bottom side of each wheel assembly between the two rows of wheels and which is suitable for receiving one of the rails of the track therein as the wheels roll along the track. More particularly, a lower peripheral surface of the wheels in each row of wheels of each wheel assembly forms one side of the inverted V-shaped recess of the wheel assembly which receives the respective rail member therein.

Each wheel 52 of each wheel assembly (and the respective axis about which it rotates) is arranged to be offset or spaced in the longitudinal direction of rolling movement relative to each of the wheels (and axles about which they are rotatable) of the other row of wheels of the wheel assembly. In this arrangement within each wheel assembly, the wheels alternate between the two rows of wheels in the longitudinal direction of the wheel assembly to ensure no wheels overlap or are aligned with one another in the longitudinal direction.

A pivot assembly 54 supports each leg 32 on the respective wheel assembly 46 such that the wheel assembly is pivotal about a vertical axis extending through the outer end of the respective leg 32 relative to the leg and base upon which it is supported. Each pivot assembly 54 also includes a horizontal shaft connecting the channel 48 of the wheel assembly to the respective leg for pivotal movement of the wheel assembly relative to the legs and base about a horizontal axis. The horizontal axis of the horizontal shaft is centered in the longitudinal direction relative to the wheels of the wheel assembly 46 and is perpendicular to the longitudinal direction of rolling movement of the wheels. Accordingly each wheel assembly 46 is permitted to rock forwardly and rearwardly relative to the base in the direction of rolling movement.

In use, the rails of the track are first laid on the ground or over various supports to define a desired path of camera movement. The deck 34 is then removed from the base 20 of the dolly so that the legs 32 can be pivoted into a desired configuration having suitable wheel base dimensions that the overall width of the dolly perpendicular to the longitudinal direction of rolling movement corresponds approximately to the width between the two rails of the track. The deck 34 is then fastened to the legs to secure the legs in the desired position by aligning the legs with one of the sets of mounting apertures in the deck. Any minor variations in the width between the rails of the track is accommodated for by the outer end portions 44 of two of the legs which pivot relative to the base and allow the wheel assemblies at the outer end thereof to varying in spacing relative to the wheel assemblies of the other two legs. The camera is then supported on the base of the dolly by screwing the post into the threaded aperture in the base and then supporting a suitable jib or other camera mount on the post spaced above the base 20.

As the dolly is displaced for rolling movement along the rails of the track, any hills or bumps in the track cause the wheel assemblies to rock about the respective horizontal pivots of the pivot assemblies 54 so that substantially all of the wheels remain in contact with the rails at all times to prevent derailments. The longitudinal offset of the wheels within each wheel assembly also minimizes the reaction of the wheel assemblies to any bumps encountered to further discourage derailments of the dolly from the track.

The dolly can also support a camera operator seat thereon or other equipment relating to the camera and displacement of the dolly along the track.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A camera dolly comprising:
   a base arranged to support a camera thereon;
   a plurality of legs extending from the base; and
   a wheel assembly associated with each leg of the plurality of legs;
   each wheel assembly comprising a plurality of wheels supported for rolling movement in a longitudinal direction of the wheel assembly;
   at least one of the wheels of each wheel assembly being spaced in the longitudinal direction of the wheel assembly from at least one other one of the wheels of the wheel assembly;
   each wheel assembly including a pivot assembly which supports the wheel assembly including the plurality of wheels thereof on the leg associated therewith such that the wheel assembly is arranged for pivotal movement relative to the leg associated therewith about a first axis which is upright and such that the wheel assembly is arranged for pivotal movement relative to the leg associated therewith about a second axis which is generally horizontal and perpendicular to the longitudinal direction of the wheel assembly; and
   the second axis of each wheel assembly being located between respective wheels of the wheel assembly in the longitudinal direction of the wheel assembly.

2. The camera dolly according to claim 1 wherein the plurality of wheels of each wheel assembly are arranged in two rows of wheels extending in the longitudinal direction of the wheel assembly, each of the wheels of each row of wheels being offset in the longitudinal direction of the wheel assembly from the wheels of the other row.

3. The camera dolly according to claim 1 wherein the wheels of each wheel assembly are supported in two rows, each wheel being rotatable about a respective axis of rotation extending downwardly and outwardly from one of the two rows of the wheel assembly which locates other ones of the wheels therein.

4. The camera dolly according to claim 3 wherein the axes of rotation of the wheels in a first one of the two rows lie in a first plane and the axes of rotation of the wheels in a second one of the two rows lie in a second plane, the first plane being oriented perpendicularly to the second plane.

5. The camera dolly according to claim 1 in combination with a track comprising a pair of parallel and spaced apart rail members along which the wheel assemblies are arranged for rolling movement in the longitudinal direction, wherein each wheel assembly comprises two rows of wheels and a lower peripheral surface of the wheels in each row of the two rows of wheels forming one side of an inverted V-shaped recess receiving a respective one of the pair of parallel and spaced apart rail members therein.

6. The camera dolly according to claim 1 wherein the base comprises an upper plate and a lower plate spanning generally horizontally spaced one above the other, an inner end of each of the legs being coupled between the upper plate and the lower plate for pivotal movement about a respective upright axis relative to the base.

7. A camera dolly comprising:
a base arranged to support a camera thereon;
a plurality of legs extending from the base; and
a wheel assembly associated with each leg of the plurality of legs;
each wheel assembly comprising a plurality of wheels supported for rolling movement in a longitudinal direction of the wheel assembly;
at least one of the wheels of each wheel assembly being spaced in the longitudinal direction of the wheel assembly from at least one other one of the wheels of the wheel assembly; and
each wheel assembly including a pivot assembly which supports the wheel assembly including the plurality of wheels thereof on the leg associated therewith such that the wheel assembly is arranged for pivotal movement relative to the leg associated therewith about a first axis which is upright and such that the wheel assembly is arranged for pivotal movement relative to the leg associated therewith about a second axis which is generally horizontal and perpendicular to the longitudinal direction of the wheel assembly;
wherein two adjacent ones of the plurality of legs each include a respective outer end portion supported for pivotal movement relative to a respective remaining inner portion mounted on the base about a respective upright axis, the wheel assemblies of said two adjacent ones of the plurality of legs each being supported on the respective outer end portion spaced radially outward from the respective upright axis whereby spacing of the wheel assemblies of said two adjacent ones of the plurality of legs from other ones of the wheel assemblies varies when the respective outer end portion are pivoted relative to the respective remaining inner portions.

8. A camera dolly comprising:
a base arranged to support a camera thereon;
a plurality of legs extending from the base; and
a wheel assembly associated with each leg of the plurality of legs;
each wheel assembly comprising a plurality of wheels supported for rolling movement in a longitudinal direction of the wheel assembly;
at least one of the wheels of each wheel assembly being spaced in the longitudinal direction of the wheel assembly from at least one other one of the wheels of the wheel assembly; and
each wheel assembly including a pivot assembly which supports the wheel assembly including the plurality of wheels thereof on the leg associated therewith such that the wheel assembly is arranged for pivotal movement relative to the leg associated therewith about a first axis which is upright and such that the wheel assembly is arranged for pivotal movement relative to the leg associated therewith about a second axis which is generally horizontal and perpendicular to the longitudinal direction of the wheel assembly;
wherein the base comprises a central base member from which each one of the plurality of legs extends in a generally radial direction, each leg of the plurality of legs being coupled to the central base member for pivotal movement relative to the central base member about an upright axis to adjust a spacing between the wheel assemblies upon which the legs are supported.

9. The camera dolly according to claim 8 wherein each leg of the plurality of legs is pivotally supported on the base for pivotal movement relative to the base in a generally horizontal plane between a first position oriented substantially parallel to the longitudinal direction and a second position oriented near 45 degrees in inclination to the longitudinal direction.

10. The camera dolly according to claim 8 wherein there is provided a mounting member fixedly coupling the plurality of legs relative to one another at a selected one of plural different orientations relative to one another.

11. The camera dolly according to claim 10 wherein the mounting member comprises plural sets of mounting apertures therein arranged for receiving fasteners therethrough for securement to the plurality of legs to fix the plurality of legs relative to one another, each set of mounting apertures corresponding to a different relative orientation of the plurality of legs.

12. The camera dolly according to claim 10 wherein the mounting member comprises a generally horizontally extending deck plate spanning a top side of the plurality of legs.

13. A camera dolly comprising:
a base arranged to support a camera thereon;
a plurality of legs extending from the base; and
a wheel assembly associated with each leg of the plurality of legs;
each wheel assembly comprising a plurality of wheels supported for rolling movement in a longitudinal direction of the wheel assembly;
at least one of the wheels of each wheel assembly being spaced in the longitudinal direction of the wheel assembly from at least one other one of the wheels of the wheel assembly; and
each wheel assembly including a pivot assembly which supports the wheel assembly including the plurality of wheels thereof on the leg associated therewith such that the wheel assembly is arranged for pivotal movement relative to the leg associated therewith about a first axis which is upright and such that the wheel assembly is arranged for pivotal movement relative to the leg associated therewith about a second axis which is generally horizontal and perpendicular to the longitudinal direction of the wheel assembly;
wherein the base comprises a central member from which each leg of the plurality of legs extends in a generally radial direction, the base including an internally threaded socket formed therein and wherein there is provided a post threadably received in the internal socket which is arranged to support a camera thereon spaced above the base, the plurality of legs being coupled to the central member at circumferentially spaced positions about the internally threaded socket.

14. A camera dolly for rolling movement in a generally longitudinal direction, the camera dolly comprising:
a base arranged to support a camera thereon;
a plurality of legs extending from the base;
a wheel assembly associated with each leg of the plurality of legs and arranged to support the leg associated therewith on the wheel assembly;
the base comprising a central member from which each leg of the plurality of legs extends in a generally radial direction;
each leg of the plurality of legs being coupled to the central base member for relative pivotal movement to adjust a spacing between the wheel assemblies upon which the plurality of legs are supported; and
a mounting member fixedly coupling the plurality of legs relative to one another at a selected one of plural different orientations relative to one another;
the mounting member comprising a generally horizontally extending deck plate spanning a top side of the plurality of legs and including plural sets of mounting apertures therein arranged for receiving fasteners therethrough for securement to the plurality of legs to fix the plurality of legs relative to one another, each set of mounting apertures corresponding to a different relative orientation of the plurality of legs.

15. The camera dolly according to claim 14 wherein each leg of the plurality of legs is pivotally supported on the base for pivotal movement relative to the base in a generally horizontal plane between a first position oriented substantially parallel to the longitudinal direction and a second position oriented near 45 degrees in inclination to the longitudinal direction.

16. A camera dolly for rolling movement in a generally longitudinal direction, the camera dolly comprising:
a base arranged to support a camera thereon;
a plurality of legs extending from the base;
a wheel assembly associated with each leg of the plurality of legs and arranged to support the leg associated therewith on the wheel assembly;
the base comprising a central member from which each of the plurality of legs extend in a generally radial direction;
each leg of the plurality of legs being coupled to the central base member for relative pivotal movement to adjust a spacing between the wheel assemblies upon which the plurality of legs are supported; and
a mounting member fixedly coupling the plurality of legs relative to one another at a selected one of plural different orientations relative to one another;
wherein the base comprises an upper plate and a lower plate spanning generally horizontally spaced one above the other, an inner end of each leg of the plurality of legs being coupled between the upper plate and the lower plate for pivotal movement about a respective upright axis relative to the base.

17. The camera dolly according to claim 14 wherein the base comprises a central member from which each leg of the plurality of legs extends in a generally radial direction, the base including an internally threaded socket formed therein and wherein there is provided a post threadably received in the internal socket which is arranged to support a camera thereon spaced above the base, the plurality of legs being coupled to the central member at circumferentially spaced positions about the internally threaded socket.

* * * * *